United States Patent [19]
Ditzel et al.

[11] Patent Number: 5,043,870
[45] Date of Patent: Aug. 27, 1991

[54] COMPUTER WITH AUTOMATIC MAPPING OF MEMORY CONTENTS INTO MACHINE REGISTERS DURING PROGRAM EXECUTION

[75] Inventors: David R. Ditzel, Watchung; Hubert R. McLellan, Jr., Califon, both of N.J.

[73] Assignee: AT&T Bell Laboratories, Murray Hill, N.J.

[21] Appl. No.: 368,089

[22] Filed: Jul. 19, 1989

Related U.S. Application Data

[63] Continuation of Ser. No. 55,965, Jun. 1, 1987, abandoned, which is a continuation-in-part of Ser. No. 827,661, Feb. 7, 1986, abandoned, which is a continuation-in-part of Ser. No. 351,656, Feb. 24, 1982, abandoned.

[51] Int. Cl.[5] .............................................. G06F 12/08
[52] U.S. Cl. ................................. 364/200; 364/247.7; 364/243.41; 364/259.2
[58] Field of Search ... 364/200 MS File, 900 MS File

[56] References Cited

U.S. PATENT DOCUMENTS

| | | | |
|---|---|---|---|
| 4,530,049 | 7/1985 | Zee | 364/200 |
| 4,574,349 | 3/1986 | Rechtschaffen | 364/200 |
| 4,594,659 | 6/1986 | Guenthner et al. | 364/200 |
| 4,761,733 | 8/1988 | McCrocklin et al. | 364/200 |
| 4,811,208 | 3/1989 | Myers et al. | 364/200 |

OTHER PUBLICATIONS

Aho et al., "Principles of Compiler Design", Addison-Wesley Publ. Co., 1977, pp. 44, 45, 64-68, 254-258, 350-363.

McGlynn, "Microprocessors Technology, Architecture, and Applications", John Wiley & Sons, 1976, pp. 5-12.

Primary Examiner—Thomas M. Heckler
Attorney, Agent, or Firm—J. W. Herndon

[57] ABSTRACT

A computer system arranged for faster processing operations by providing a stack cache in internal register memory. A full stack is provided in main memory. The stack cache provides a cache representation of part of the main memory stack. Stack relative addresses contained in procedure instructions are converted to absolute main memory stack addresses. A subset of the absolute main memory stack address is used to directly address the stack cache when a "hit" is detected. Otherwise, the main memory stack is addressed. The stack cache is implemented as a set of contiguously addressable registers. Two stack pointers are used to implement allocation space in the stack as a circulating buffer. Cache hits are detected by comparing the absolute stack address to the contents of the two circular buffer pointers. Space for a procedure is allocated upon entering a procedure. The amount of space to allocate is stored in the first instruction. Space is deallocated when a procedure is terminated. The deallocation space is stored in the first instruction executed after procedure termination.

15 Claims, 2 Drawing Sheets

STACK FRAME LAYOUT OF MAIN MEMORY

COMPUTER WITH AUTOMATIC MAPPING OF MEMORY CONTENTS INTO MACHINE REGISTERS DURING PROGRAM EXECUTION

This application is a continuation of application Ser. No. 055965, filed on June 1, 1987, abandoned, which is a continuation-in-part of Application Ser. No. 827,661, filed on 2/7/86, abandoned, which is a continuation-in-part of Application Ser. No. 351,656 filed 2/24/82, abandoned.

TECHNICAL FIELD

This invention relates to digital computers and, in particular, to the automatic allocation of machine registers.

BACKGROUND OF THE INVENTION

Digital computers have for many years employed registers as the lowest level in the hierarchy of computer storage devices. Registers have faster access time than main memory, but, because of cost, are few in number. The use of registers was at one time controlled directly by the machine language programmer. The use of registers is now controlled principally by another computer program, the compiler. The compiler transforms an easier to understand high level source language into the lower level object language of the machine. Part of this transformation task performed by the compiler is to place currently active data items in registers as much as possible. In this fashion, references to main memory are reduced, leading to faster overall performance. This task, called register allocation, is burdensome to the compiler program, resulting in compilers that are large and complex, awkward to maintain, and costly to prepare.

Computer instructions specify the data operands to be used in an arithmetic or logical operation through the use of addressing modes. An address is the common term used to describe the location in storage of a particular piece of data or an instruction. An addressing mode may, for example, specify that the data is to be found in a register, at an address specified in the instruction, or at an address contained in a particular register specified in the instruction. In a particularly common addressing mode, called "relative addressing" and found in many computers, the address of an operand is formed by adding the contents of a register to a constant specified in the instruction. This addressing mode is frequently used in the implementation of what is called a stack data structure. Because of this common use, the term "stack relative addressing" is frequently employed, and the particular register is called the stack pointer register.

Stack relative addressing is commonly used by compilers, using a data structure called a stack to allocate space in the computer's memory for local program variables, parameters, and temporary storage. Allocating space on a stack is advantageous because it provides a very simple and efficient technique for allocating space. The details of such a stack and how it is used by the compiler will not be discussed in more detail here; such details are common enough to be found in nearly any text on compiler design. One such book is "Principles of Compiler Design", by Messrs A. V. Aho and J. D. Ullman, Addison-Wesley Publishing Co., (1977).

Local variables for a procedure (i.e., variables to be used only in that procedure) are usually allocated on a stack. For a computer with registers, it is the job of the compiler program to move variables from the main memory into registers whenever possible to improve computer speed. Such register allocation is a difficult task for a compiler program and often requires more than one pass through a source program to allocate registers effciently. Furthermore, when one procedure is in the process of being executed and it is necessary to call another procedure, because the registers are limited in number, the contents of the registers must be saved in the main memory before the other procedure can be called. This process is called register saving. The registers are often saved on a stack, as mentioned above. Similarly, registers must be restored when returning to the calling procedure. Compiler program design would be greatly simplified and program execution would be faster if such register allocation was not required.

Computers without registers already exist and are know as memory-to-memory computers. A computer without such registers, however, incurs a penalty of reduced execution speed.

SUMMARY OF THE INVENTION

In accordance with the illustrative embodiment of the present invention, both the speed advantages of register-oriented computers and the compiler simplifications resulting from memory-to-memory oriented computers are realized in a single machine by providing a mechanism in which memory contents for local variable allocation are automatically mapped into machine registers (a stack cache) during program execution. This process called "binding", was performed in the prior art during compilation of the program and not during execution.

In most cases, all local variables used by a program will be allocated to registers in the stack cache, providing a significant improvement over prior art compiler programs which assign only some of the local variables to register. In addition, the present invention usually eliminates the need for register saving and restoring for procedure calls, required by prior art register oriented machines.

More particularly, when a program or subroutine is first initiated, space for storing local variables is allocated on a stack cache. The stack cache is a set of contiguously addressable registers, which together with the main memory form a logical stack. As instructions are prefetched from the main computer memory, instructions are partially decoded before being placed in an instruction cache. As part of this decoding, operand identifiers with stack relative addresses, i.e., the value of a stack pointer plus an offset, are operated upon to form an absolute memory address. This memory address replaces the stock relative address in the instruction cache. These operand addresses in the instruction cache are checked to see if they fall within the range of addresses for which the corresponding data are currently stored in the register set. If so, then the addressing mode is changed so that the address may be used as a register index. In this fashion, registers are automatically allocated by hardware, rather than by traditional compiler methods. When a program or subrouting is terminated, the register space for local variables in the stack cache is automatically deallocated.

A major advantage of the present invention is that the registers take the form of a circular buffer and the lower order bits of the absolute memory address can also be used as the register address in the buffer. Another major advantage is that registers are automatically allocated, deallocated and populated with local variable data for procedures and subroutines usually without incurring the penalty of having to access the slower main memory. Register saving and restoration is also done in the stack cache for subroutines, again usually without having to access the main memory.

DETAILED DESCRIPTION

Figure 1:
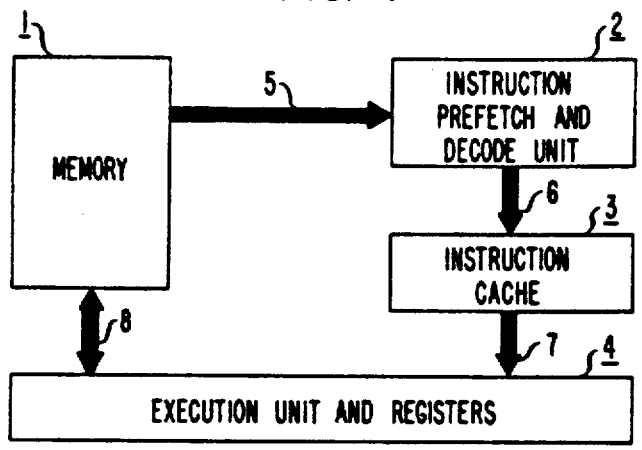
FIG. 1 is a block diagram of relevant parts of a digital computer and useful in describing the present invention.

Referring to FIG. 1, there is shown a block diagram of the relevant parts of a digital computer which are useful in implementing the present invention. Data and instructions are stored in main memory 1. Data operands are fetched from memory 1 under control of the execution unit 4 over bus 8 and stored in the execution unit 4, to be described more fully below. Instructions are fetched from memory 1 over bus 5 by the instruction prefetch and decode unit 2. In accordance with the present invention, the instructions are partially decoded, as will be described more fully below, in the prefetch and decode unit 2. The partially decoded instructions are then placed in the instruction cache 3 over bus 6. From instruction cache 3, the partially decoded instructions are read by the execution unit 4 over bus 7. The instructions are executed in the execution unit 4 using the aforesaid operands.

Figure 2:
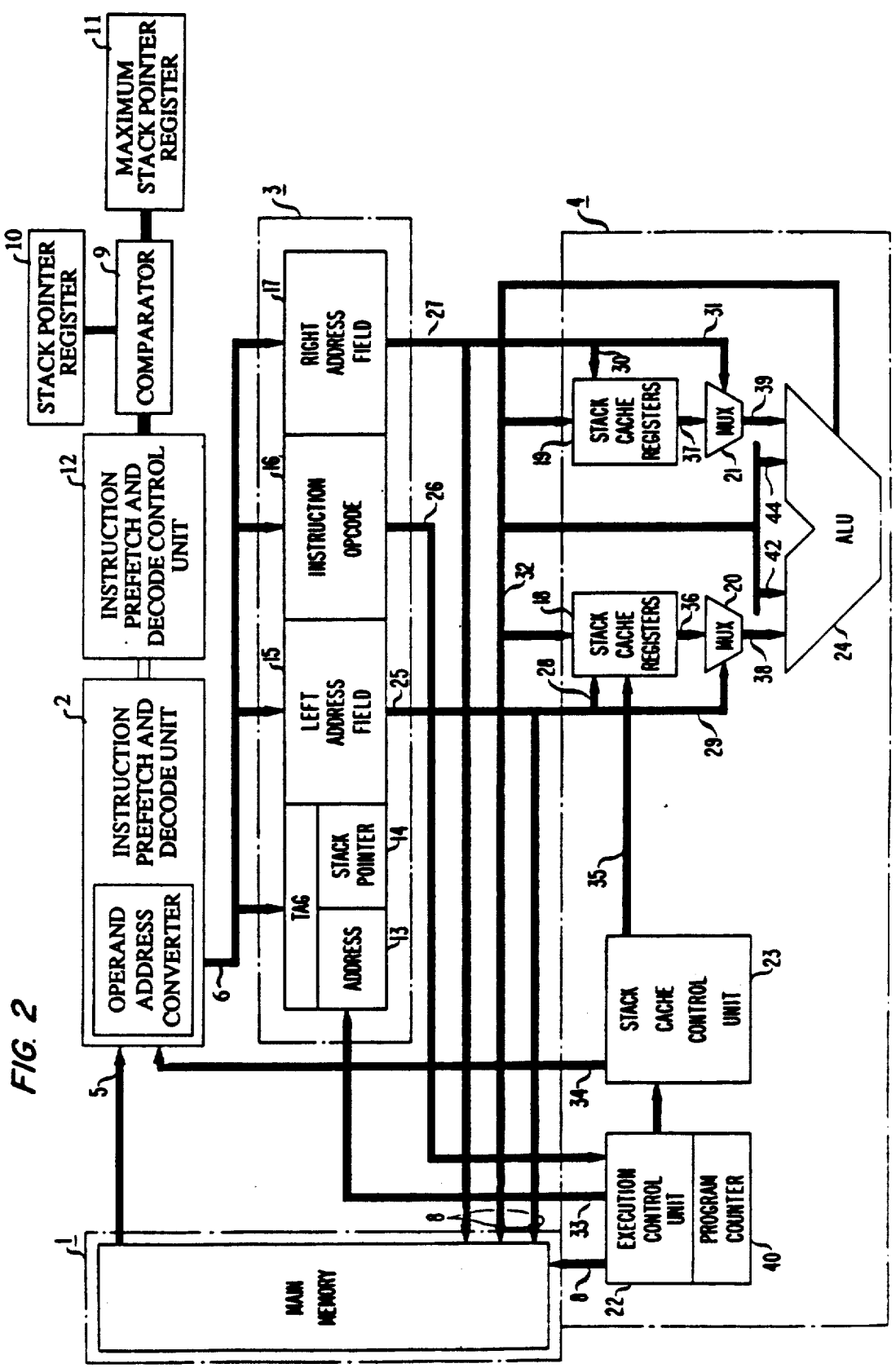
FIG. 2 is a more detailed block diagram of the relevant parts of a digital computer disclosed in FIG. 1.

Referring to FIG. 2, there is shown a more detailed block diagram of the relevant parts of FIG. 1. Instructions are fetched from main memory 1 over bus 5 under control of instruction prefetch and decode unit 2. Stack pointer register 10 performs the traditional function of delimiting the boundary between free and used space in a stack. Stack pointer register 10 with the maximum stack pointer register 11 also performs the functions of head and tail pointers, respectivly, in implementing traditional circular buffers which contain the top data elements of the stack. The data for the circular buffers is contained in stack caches 18 and 19 which contain identical data, these stack caches being memory registered devices. Stack pointer in register 10 points to the lowest address of data currently maintained in stack caches 18 and 19. The maximum stack pointer in register 11 points to the highest address of data currently maintained in stack caches 18 and 19.

Instruction cache 3 is a conventional cache memory device which saves the most recently used instructions. The instruction cache 3 may hold many instructions, and for each instruction there exist several fields: the instruction opcode field 16, the left address field 15 (first operand of an instruction), the right address field 17 (second operand of an instruction), and the tag which is composed of the instruction address field 13 and the value of the stack pointer 14 associated with the particular instruction. The left address field 15 and the right address field 17 hold the addresses for accessing the operands specified in an instruciton from the stack cache 18 and 19, or from main memory if the operands are not in the stack cache, which may be sent to the left and right inputs 38 and 39, respectively, to the ALU 24. The addressing mode, e.g., main memory 1 or stack caches 18 and 19, of each operand is held in the instruction opcode field 16 of the instruction cache 3. In most computers with a cache, a prefetch unit would fetch instructions from memory 1 and place them directly in instruction cache 3 without any intervening conversions. In accordance with the present invention however, the prefetch and decode unit 2 will decode stack relative addressing modes before proceeding to place the instruction in instruction cache 3, as described in the next paragraph. This method is possible because the calling sequence and instruction set, as will be described more fully below, guarantee that the stack pointer in register 10 will not change except at procedure call and return.

When an instruction with a stack relative addressing mode is fetched by the prefetch and decode unit 2, the value of the stack pointer in register 10 is added to the value of the offset specified in the instruction by operand address converter 41 to form the absolute memory address of the operand. The computed memory address of the operand, will be placed in the instruction cache 3 in the appropiate left or right address field 15 or 17. When the prefetch and decode unit 2 converts a stack relative address to that of a memory address, that memory address is also checked to see if the data resides in the stack cache registers 18 and 19 or in main memory 1. This check is accomplished by comparing, in comparator 9, the operand memory address with the stack pointer in register 10 and with the maximum stack pointer in register 11. If the memory address lies between the value of the stack pointer in register 10 and the value in maximum stack pointer register 11, inclusive, then the data will be resident in stack caches 18 and 19 and the addressing mode of the instruction is changed from stack relative addressing to the register addressing mode. If the memory address does not lie between the address of the stack pointer 10 and the maximum stack pointer 11, inclusive, then the data will be resident in main memory 1, and the addressing mode of the instruction is changed from stack relative addressing to main memory address mode.

Under control of execution control unit 22, such as a programmable logic array, instructions from instruction cache 3 are transmitted to the execution unit 4. More particularly, the left and right operands for the arithmetic and logic unit 24 are obtained by addressing either memory 1 or the stack caches 18 and 19 over bus 25 and buss 27, respectively. The following discussion refers to the left operand. If the addressing mode of the left operand is that of a main memory address, then the address sent over bus 25 and buss 8 will cause main memory 1 to send the requested operand to the left ALU input 42 over bus 32. If the addressing mode of the left operand is that of a stack cache register, then the low order bits of the word address from bus 25 is sent to stack cache registers 18 over bus 28 and the data is presented on bus 36. The word address is the most significant bits that address a full memory or stack cache word, rather than bites of a word. The exact number of lines of bus 28 for the low order bits of the word address from bus 25 is the base two logarithm of the number of the stack cache registers 18. The number of registers in 18 and 19 should be a power of two. For example, if 1024 registers were to be provided, then bus 28 would consist of 10 signal lines.

The use of a subset of a main memory address for addressing the stack caches 18 and 19, is a distinct advantage of the present invention because no intervening conversions are necessary which would cause loss of efficiency. In accordance with the present invention, thus, the address on bus 28 functions as an automatically computed register address to registers 18. Byte addressing, for example with a four byte wordsize, is provided by sending the low two bits of the byte address from bus 25 to multiplexor 20 over bus 29. In this fashion, full words, half-words, or bytes may be read, though full words and half-words may not cross word boundaries. Multiplexor 20 provides the necessary alignment and sign extension of operands for byte addressing.

Pursuant to register mode addressing, the left operand data from the cache 18 or main memory 1 is supplied to the left ALU input over bus 38. Similarly, the right operands are developed in a symmetric fashion to the left operands with registers 19, multiplexor 21, busses 30 and 31. The advantage of duplicating the registers 18 and 19, and the multiplexors 20 and 21, resides in permitting faster access to both left and right ALU operands through parallelism. When the ALU 24 has computed the result using the left and right operands, the result is sent via bus 32 back to either registers 18 and 19 or to main memory 1, in accordance with the addressing mode specified for the destination.

Execution control unit 22 operates based upon the value of the program counter 40 and the instruction presented on bus 26. The logically sequential instruction from the instruction cache 3 is requested from execution control unit 22 over bus 33.

Unlike traditional caches, the registers in stack cache 18 and 19 hold contiguously addressable words of memory, and are far less costly to implement in terms of complexity and circuit density than traditional caches.

INSTRUCTION SET

Four program instructions must be used for maintaining the stack cache registers 18 and 19: CALL, RETURN, ENTER and CATCH. Of all machine instructions, only ENTER and RETURN are allowed to modify the stack pointer in register 10.

Figure 3:
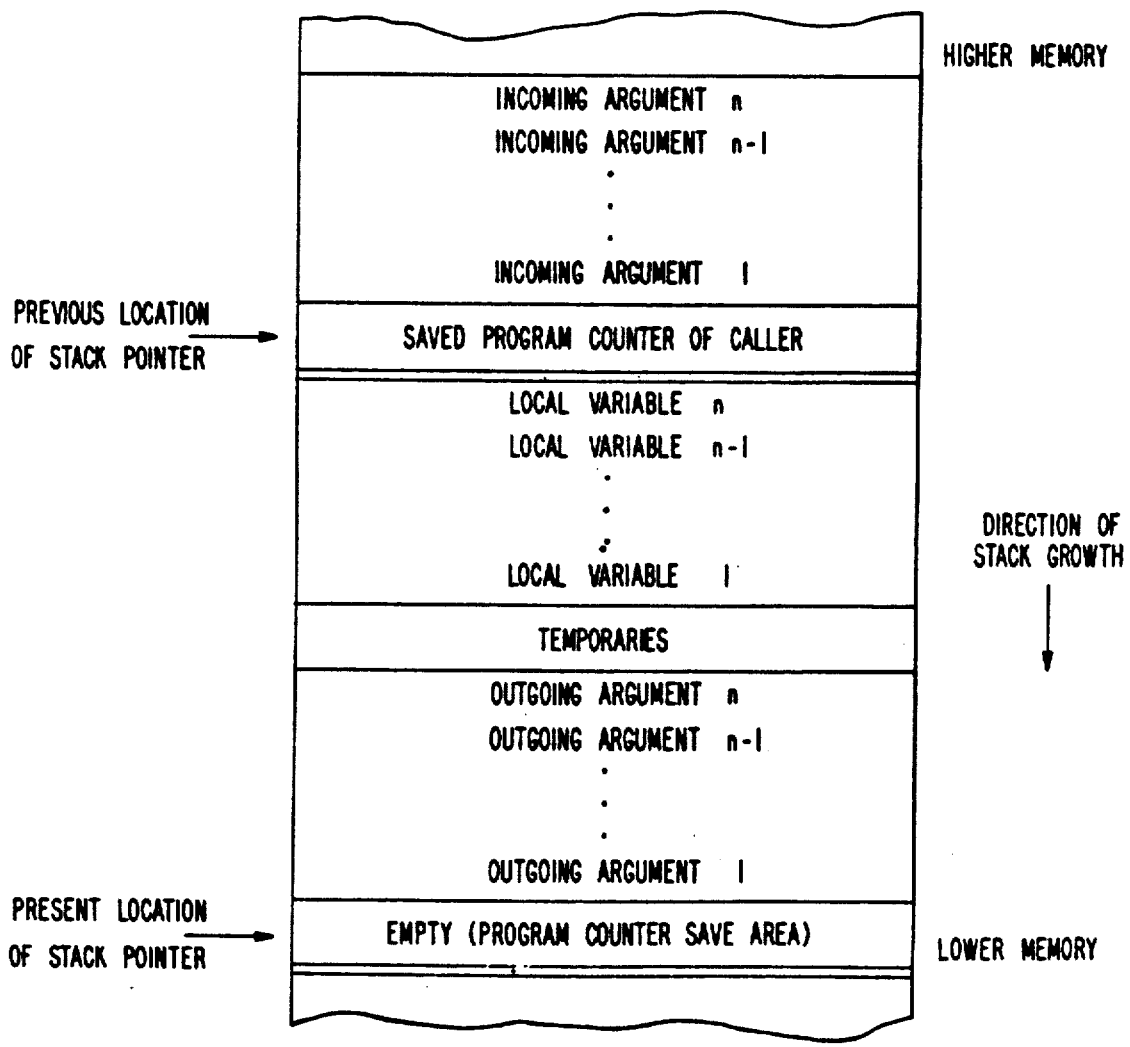
FIG. 3 is a graphical representation of a stack frame of the main memory of the digital computer of FIG. 1.

The CALL instruction transfers control to a subroutine. It takes the return address for the subroutine, usually the present value of the program counter 40, and saves it on the stack, then branches to the target address. For ease in visualization, a stack frame as used in the present invention is shown in FIG. 3.

The target of a CALL instruction (i.e., the first instruction of a subroutine) is an ENTER instruction. The ENTER instruction is used to allocate space for the new subroutine's stack frame by subtracting the size of the new stack frame it requires in machine words, from the stack pointer in register 10. The traditional saving of registers required when calling subroutines is avoided because a new set of stack registers is allocated for the subroutine. Thus, there is no danger of overwriting data required to be restored on return to the calling procedure.

The RETURN instruction returns control to the calling procedure, but first deallocates its stack space allocated by the ENTER instruction by adding its operand to the stack pointer in register 10, then branching to the return address on the stack.

The CATCH instruction is always the next instruction executed by the calling procedure following a RETURN instruction and is used to guarantee that the stack cache registers 18 and 19 are filled at least as deep as the number of entries specified by the operand of the CATCH instruction.

ENTER and CATCH instructions handle the cases where the registers of stack caches 18 and 19 are not large enough to hold the entire stack. When a procedure is entered, the ENTER instruction attempts to allocate a new set of registers in the stack caches 18 and 19 equal to the size of the new stack frame. If free register space exists in stack caches 18 and 19 for the entire new stack frame, all that needs be done is to modify the stack pointer in register 10.

If there exists insufficient free space to hold the entire new stack, the entries nearest the address pointed to by the maximum stack pointer in register 11 of stack caches 18 and 19 are flushed to the stack in memory 1 over bus 32 under the control of stack cache control unit 23. When the size of the new stack frame is less than the size of stack caches 18 and 19, only the size of the new stack frame minus the number of free entries must be flushed back to memory 1. When the size of the new stack frame is greater than the size of the entire stack cache 18 or 19, all active entries then preexisting in stack cache registers 18 and 19 are flushed back to memory 1 under control of stack cache control unit 23 over bus 32. Furthermore, only the part of the new frame nearest the address pointed to by the stack pointer in register 10, that is, the top entries, is kept in the stack caches 18 and 19.

Upon procedure return, it is not known how many entries from stack caches 18 and 19 had to be flushed to memory 1 since the call. Accordingly, some entries may need to be restored to the stack cache from the stack in memory 1. The argument of the CATCH instruction specifies this number of entries that must be restored before the flow of execution can resume.

The use of the CATCH instruction is the guarantee that stack cache by instructions already in the instruction cache 3 can be bound to register numbers and accessed as would be traditional registers without having to check to see if the data is actually resident in the stack caches 18 and 19. Unlike normal caches, but like general purpose registers, a stack cache reference will never miss. An advantage of the present invention is that the access time of stack cache registers 18 and 19 will be substantially equal to that of registers in a general register machine (not shown).

The phrase 'stack cache' has been used, as described above, to name the circular buffer registers 18 and 19 because of the early binding of stack offsets and in assigning register numbers automatically. There is no restriction from using a similar mechanism to "cache" any other particular piece of memory. For example, substantial benefits can be gained from allocating a small number of registers for global variables.

That is, in addition to registers in stack caches 18 and 19 used for local variables, similar registers (not shown) may be used for mapping therein global variables from the memory 1. These registers would cover a static area of memory and therefore not require the use of circular buffers. Even large programs tend to use relatively few scalar global variables; a small percentage of these account for most of the dynamic usage of global variables.

Making the internal machine registers, that is, registers in 18 and 19, invisible to the compiler has several advantages. Object program code generation is considerably eased because no register allocation is required. As stated earlier herein, in many cases only a single one pass compiler is needed; a large optimizing compiler requiring several passes is not required for the efficient allocation of local variables to registers. Because only a single pass compiler is required, the compiler will run faster. The compiler will be smaller and easier to write and thereby more likely to be free from "bugs".

A major architectural concern in designing a very large scale integrated (VLSI) microprocessor (not shown) is to reduce off chip memory access time. While switching speeds of individual transistors are increasing, the relatively constant off chip speeds will adversely affect any processor that has to make many external references. Improvements in processing technology will only make the gap wider. The reduction in memory references gained with the registers in stack caches 18 and 19 is particularly attractive for use with a VLSI processor. Because the registers are invisible to the compiler, implementations with different numbers of registers create no compatibility problems. As VLSI processing technology improves, more registers may be added to stack caches 18 and 19 without requiring a change in either the compiler or the set of instructions.

We claim:

1. A computer system including a processor and a main memory with a stack, the processor comprising
    a stack pointer register delineating the beginning of unallocated stack memory space,
    a set of contiguously addressable registers forming a stack cache,
    a maximum stack pointer register, the contents of the stack pointer register and the contents of the maximum stack pointer register defining a contiguous set of addresses in the main memory stack and a corresponding set in the stack cache that are allocated to a program procedure for storing of data by the procedure,
    means for fetching a procedure instruction from main memory,
    means for converting a stack relative address in the instruction into an absolute memory stack address,
    means for comparing the absolute memory stack address to the contents of the stack pointer register and to the contents of the maximum stack pointer register to determine if the stack cache has valid data for the absolute memory stack address, and
    means responsive to the comparing means for addressing the stack cache if valid data is present in the stack cache or, otherwise, the main memory stack.

2. The system of claim 1 wherein the means for addressing the stack cache or the main memory stack comprise means for directly mapping the main memory stack addresses to the stack cache addresses.

3. The system of claim 1 wherein the stack cache, the stack pointer register and the maximum stack pointer register form a circular buffer for the storage of temporary data by procedures.

4. In a computer system including a processor and a main memory with a stack, a stack cache, a stack pointer delineating the beginning of free stack memory space and a maximum stack pointer, the contents of the stack pointer and the contents of the maximum stack pointer defining a contiguous set of stack addresses that are allocated to a program procedure, a method of increasing the speed of operation of the system, comprising the steps of
    fetching an instruction from main memory,
    converting a relative stack address for a data operand in the instruction to an absolute memory address in the stack,
    determining if the stack cache contains valid operand data for the stack absolute address,
    fetching the operand data from the stack cache if the cache contains valid operand data, and, otherwise,
    fetching the operand data from the main memory stack.

5. The method of claim 4 wherein the step of determining if the stack cache contains valid operand data further comprises the step of
    comparing the absolute memory stack address to the contents of the stack pointer and to the contents of the maximum stack pointer.

6. The method of claim 5 further comprising the step of
    allocating a section of the stack memory for a procedure when the procedure is first activated.

7. The method of claim 6 further comprising the step of
    deallocating the section of stack memory for the procedure when the procedure is terminated.

8. The method of claim 7 wherein the stack pointer and the maximum stack pointer define a circular buffer in the stack cache.

9. The method of claim 8 further comprising the step of
    flushing to the main memory stack part of the contents of the stack cache to make room for the allocation of a new section of stack memory in the stack cache when the stack cache contains insufficient free space to make the allocation.

10. The method of claim 9 further comprising the step of
    restoring from the main memory stack at the termination of a procedure parts of the stack cache that were flushed from the stack cache since the initiation of the procedure.

11. The method of claim 10 wherein the number of stack cache entries to be restored are embedded in a processor instruction executed at the termination of the procedure.

12. The method of claim 7 wherein the steps of allocating and deallocating further comprise
    embedding in instructions executed by the system the amount of stack memory to allocate and deallocate for the procedure.

13. The method of claim 7 wherein the step of allocating further comprises
    embedding in the first instruction of the procedure the amount of stack memory to be allocated.

14. The method of claim 7 wherein the step of deallocating further comprises
    embedding in the first instruction executed upon termination of the procedure the amount of stack memory to be deallocated.

15. The method of claim 7 further comprising the step of
    updating the stack pointer and the maximum stack pointer after allocating and deallocating stack memory.

* * * * *